(No Model.)

R. & S. T. BRUCE.
CORN PLANTER.

No. 262,174. Patented Aug. 1, 1882.

WITNESSES:
Thos. Houghton.
A. G. Lyne.

INVENTOR:
Robert Bruce
Sidney T. Bruce
BY
ATTORNEYS.

UNITED STATES PATENT OFFICE.

ROBERT BRUCE AND SIDNEY T. BRUCE, OF MARSHALL, MISSOURI; SAID SIDNEY T. BRUCE ASSIGNOR TO SAID ROBERT BRUCE.

CORN-PLANTER.

SPECIFICATION forming part of Letters Patent No. 262,174, dated August 1, 1882.

Application filed October 15, 1881. (No model.)

*To all whom it may concern:*

Be it known that we, ROBERT BRUCE and SIDNEY T. BRUCE, of Marshall, in the county of Saline and State of Missouri, have invented a new and useful Improvement in Corn-Planters, of which the following is a full, clear, and exact description, reference being had to the annexed drawings, forming part of this specification.

In Letters Patent No. 249,295, granted to us under date of November 8, 1881, we described a corn-planter in which the seed-dropping device is operated by means of a metallic disk, which is made to rotate through the plowed soil in contact with the hard ground underneath, the object of said arrangement being to avoid the usual irregularity of operation which results from a driving-wheel rotating in contact with the uneven surface of the soil.

Our present invention relates to a corn-planter of the above general description; and it consists in certain novel features of construction and arrangement, as will be hereinafter described.

Figure 1:
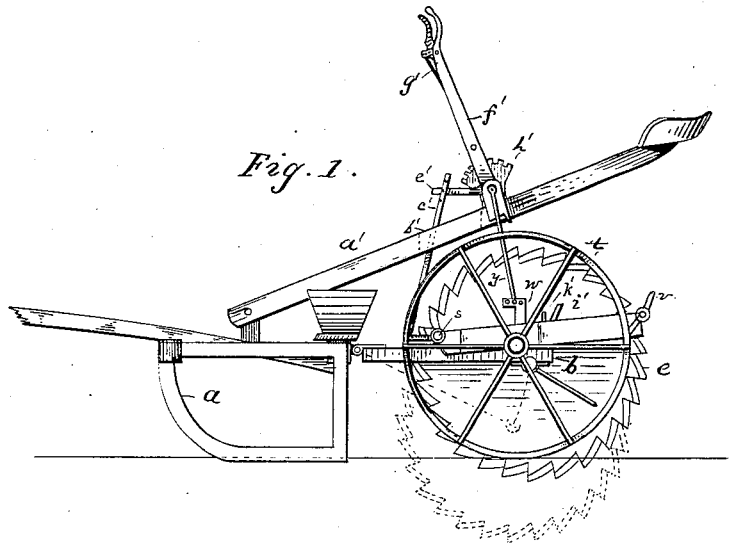
Figure 2:
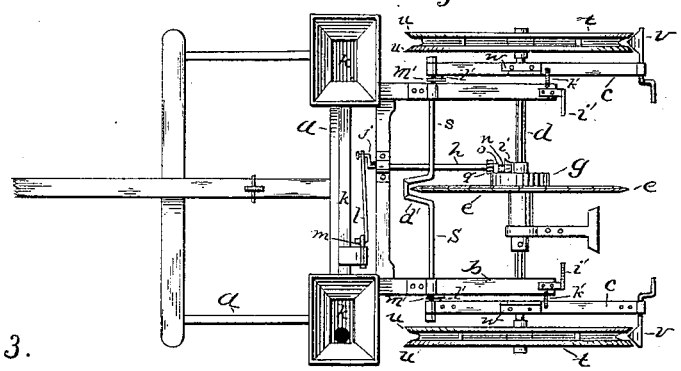
Figure 3:
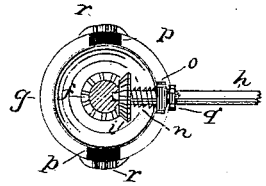
Figure 4:
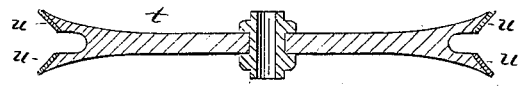
Figure 5:
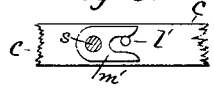

In the accompanying drawings, Figure 1 is a side elevation of our improved corn-planter; Fig. 2, a plan view of the same, and the remaining figures, 3, 4, and 5, detail views of several parts.

The planter is constructed in three parts—the forward or runner frame, $a$, the intermediate frame, $b$, which supports the driving-wheel, and which is hinged to the frame $a$, and the rear frame, $c$, which supports the covering-wheels, and which is hinged to the intermediate frame. The frame $b$, which is of rectangular form, is hinged at its forward end to the cross-bar of the frame $a$, so that its rear end may be raised or lowered at will.

At the rear end of frame $b$ is a stationary axle, $d$, upon which is journaled a thin metallic disk, $e$, having rearwardly-inclined teeth, which are sharpened at their forward edges, so that they shall be adapted for cutting through weeds and other obstacles, whereby the said disk shall rotate through the pulverized soil in contact with the hard ground underneath. As described in the patent above referred to, the design of this disk is to drive the seed-dropping device with perfect regularity; but in our former invention we employed a lever connecting with the dropping-slide and oscillated by means of a cam upon the disk. We have found, however, that a great gain of power may be secured by substituting a crank-shaft and pitman for the said lever, and accordingly we construct the disk $e$ with a small pinion, $f$, upon one of its sides, and a circular flange or collar, $g$, surrounding the pinion at a suitable distance therefrom.

A crank-shaft, $h$, having a bevel-pinion, $i$, meshing with pinion $f$, is journaled in the axle $d$ and the forward part of frame $b$, so that the crank $j$ on its forward end shall connect with the dropping-slide $k$ by means of a pitman, $l$, which is secured to the slide, near one end thereof, by a swivel-bolt, $m$, to adapt the pitman to the oscillation of frames $a$ and $b$. The pinion $i$ is journaled upon the rear end of the crank-shaft, and is provided with a neck, upon which is wound a spiral spring, $n$, secured at one end to the pinion and at the other to a projection, $o$, on the said crank-shaft. The projection $o$ is arranged so that it will slide in contact with the collar $g$ on the disk when the latter is rotated, whereby the spring is held at one end and wound upon the neck of pinion $i$. At two opposite points the collar $g$ is cut away to form recesses $p$, into which the projection $o$ shall be turned by the tension of the wound spring, and in front of said projection on the crank-shaft is a pinion, $q$, which engages with two segmental gears, $r$, arranged on the outer surface of collar $g$ so as to cover the recesses $p$. At each revolution of the disk the pinion $q$ is rotated once by the segmental gears—that is, each segmental gear is of sufficient length to complete half a revolution of the pinion $q$, and thereby operate the crank through one-half of its sweep.

It will be seen that the crank is operated not only by the pinion $q$ and the segmental gears, but also by the pinion $i$, for the pinion $i$ is employed to wind the spring $n$, and the tension of the wound spring is released as often as the projection $o$, to which the spring is secured, arrives at one of the recesses $p$, and thus the spring sets the projection $o$ and pinion $q$ in motion before the latter is struck by the segmental gears. The object of this arrangement is to relieve the pinion $q$ of the shock which would result from its being struck by the segmental gears while at rest. With this construction a smooth and regular movement is given to the dropping-slide, and the slide is so arranged that its ends shall not come in contact with any part of the hopper, whereby it shall operate without noise.

The forward part of the frame $b$ is provided with bearings for a transverse shaft, $s$, which projects beyond the frame at each side, and to which is hinged the forward part of the frame $c$. The frame $c$ is provided with covering-wheels $t$, made with bifurcated spokes, and provided with two parallel rims, $u$, which are inclined toward each other at their inner or adjacent edges, so that they will press the soil on each side of the planted row and leave it loose on top to prevent baking. This construction will also serve to break clods without pressing them into the ground. Suitable scrapers, $v$, are arranged at the rear of frame $c$, which are adapted to be pressed against the wheels by crank-shafts operated by foot-pressure. Above the axles of wheels $t$ are perforated projections $w$, to which are adjustably secured two rods, $y$, which incline toward each other and are pivoted on opposite sides of the beam or support $a'$. This beam is pivoted at its forward end to a projection on the tongue of the planter, and its rear end, which inclines upward, is provided with a seat for the driver. A rod, $c'$, whose lower end is loosely connected to a crook or curve, $d'$, in the shaft $s$, is passed upward through a vertical slot, $b'$, in the beam $a'$, and has its upper end adjustably secured to an arm, $e'$, of the crank-lever $f'$, which is supported by the beam $a'$. The lever $f'$ is provided with a stop, $g'$, of ordinary construction, which engages with a segmental rack, $h'$. As the lever $f'$ is drawn toward the driver the rod $c'$ is lifted through the said slot, and the frame $b$ and disk $e$ are raised to an elevated position, and when the lever is operated in the opposite direction the disk is set into the soil at any desired depth, and secured by means of the stop $g'$. To assist in setting the disk into the soil the frame $b$ is provided with foot-rests, $i'$, so that the driver can throw his weight upon the said frame while operating the lever $f'$, and to limit the upward movement of the said rear end of frame $b$ inwardly-projecting catches $k'$ are secured to the frame $c$.

The frame $c$ is provided with lugs $l'$ on the inner surface of its forward end, which fit in notches in the plates $m'$, secured to the ends of the rod $s$ to limit the oscillation of the said rod, and the consequent upward-and-downward movement of the plate $e$. With this construction either side of the frame $c$ may be slightly raised independently of the other, which is of advantage in passing over clods, since the machine is thereby prevented from being lifted above its normal working position.

Having thus described our invention, what we claim as new, and desire to secure by Letters Patent, is—

1. In a corn-planter, the disk $e$, having pinion $f$, secured to its hub, and collar $g$, surrounding said pinion, and having recesses $p$ and segmental gears $r$ secured to its outer surface, so as to cover said recesses, substantially as shown and described.

2. In a corn-planter, the combination, with the disk $e$, constructed as described, of the crank-shaft $h$, journaled in the axle $d$ and frame $b$, and having pinion $q$ and projection $o$ rigidly secured thereto, the bevel-pinion $i$, journaled upon shaft $h$, and the spiral spring $n$, secured to said pinion $i$ and projection $o$, substantially as shown and described.

3. In a corn-planter, the combination, with the disk $e$, having gearing, as described, and the shaft $h$, having crank $j$ and the pitman $l$, of the swivel-bolt $m$, secured to the dropping-slide $k$, near one end thereof, substantially as shown and described, whereby the pitman shall be adapted to the oscillation of frames $a$ and $b$, as set forth.

4. In a corn-planter, the combination, with the frame $b$, hinged at its forward end to the frame $a$, and carrying the disk $e$, of the frame $c$, having independently-moving sides supported upon the wheels $t$, and hinged to the frame $b$, the cross-rod $s$, having central crook, $d'$, and suitable means connected with the rod for adjusting the frame $b$ and disk $e$, substantially as shown and described.

5. In a corn-planter, the combination, with the frame $b$ and rod $s$, having notched plates $m'$, of the frame $c$, hinged to the ends of said rod, and having lugs $l'$ fitting in the notches of said plates, the catches $k'$, adjustable rods $y$, and beam $a'$, and means connected with rod $s$ for raising and lowering the frame $b$ and the disk $e$, substantially as shown and described.

ROBERT BRUCE.
SIDNEY T. BRUCE.

Witnesses for Robert Bruce:
HENRY STROTHER,
THOS. BAUTRIGHT.

Witnesses for Sidney T. Bruce:
A. G. LYNE,
SOLON C. KEMON.